E. THOMSON.
CLAMP FOR ELECTRIC METAL WORKING APPARATUS.
APPLICATION FILED APR. 27, 1911.

1,048,915.

Patented Dec. 31, 1912.

WITNESSES:

INVENTOR
ELIHU THOMSON.
BY
ATTORNEYS

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

CLAMP FOR ELECTRIC METAL-WORKING APPARATUS.

1,048,915.  Specification of Letters Patent.  Patented Dec. 31, 1912.

Application filed April 27, 1911. Serial No. 623,574.

*To all whom it may concern:*

Be it known that I, ELIHU THOMSON, a citizen of the United States, and a resident of Swampscott, in the county of Essex and State of Massachusetts, have invented certain new and useful Improvements in Clamps for Electric Metal-Working Apparatus, of which the following is a specification.

My invention relates to the form of clamping devices used in electric metal working apparatus for clamping the work which is to be welded or otherwise operated upon as to its heated section, when rendered plastic by the heating electric current.

The invention is primarily intended for the electric welding of metal plates or of sheet metal by a butt weld.

The general object of the invention is to so construct the clamps that the stock will be supported as near the edge of the heated section as possible and yet to distribute the heat evenly. In the case of welding thin stock the support of the stock as near the edge as possible will prevent the pieces to be welded from sliding by on the push-up to effect the weld.

To these ends the invention consists, generally speaking, in constructing clamps in such form that they will intermesh when they approach one another in the welding or other operation.

Figure 1:
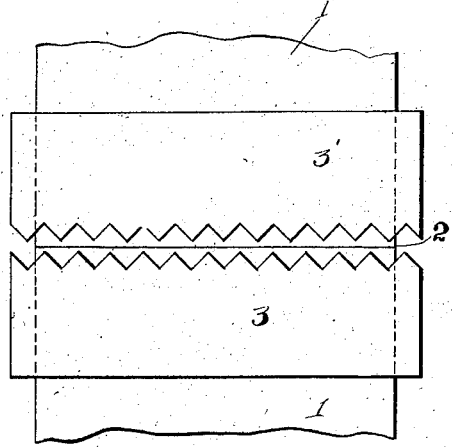
Figure 2:
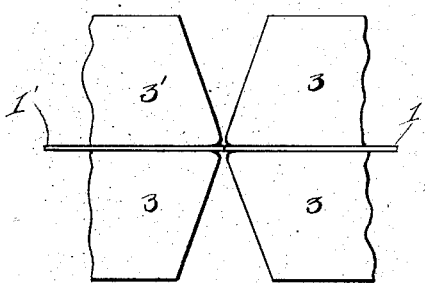
Figure 3:
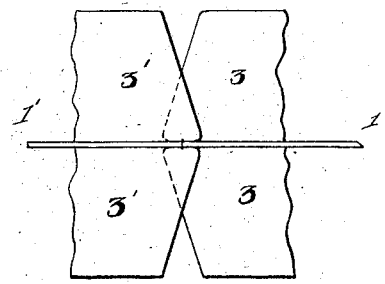
Figure 4:
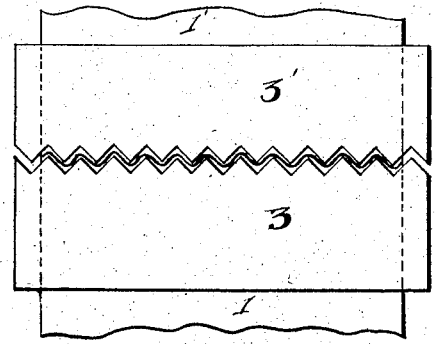

In the accompanying drawings, Figure 1 is a plan of a pair of clamps showing one of the forms of their intermeshing portions adapted to carry out my invention. Fig. 2 shows in side elevation the relative disposition of the teeth or projecting portions of the two clamps preparatory to the operation of welding. Fig. 3 shows the disposition of said teeth when the clamps intermesh. Fig. 4 is a plan of the clamps as intermeshed by the operation of forming an electric weld and shows by the irregular lines between the meeting portion of the clamps the line of the weld when the stock is prepared to meet on a straight line as shown in Fig. 1.

Referring to the drawings, wherein I have illustrated my invention as carried out with clamps used for welding, the two pieces of stock are indicated in plan at 1, 1', while 2 indicates the line on which they meet when assembled in the clamps preparatory to the electric welding operation. The pairs of clamps for holding said pieces are indicated at 3, 3' and said clamps, on their sides which approach one another in the operation of welding or other electric metal working operation, are formed as shown with teeth or projections properly disposed with relation to the teeth or projections of the opposite clamp to permit them to intermesh when approached, as shown in Figs. 3 and 4.

The teeth or projections may be of any form and the toothed face of the clamps may be what is ordinarily described as serrated. I do not, however, confine myself to a toothed edge which is, strictly speaking, a serrated edge or face. The number of teeth or projections per lineal unit of measurement across the meeting faces of the clamps may be anything desired, but ordinarily the larger the number the better will be the support and distribution of the heating current.

It will be seen, the conformation of the clamps permits the work to be supported very near the line of weld or heating and yet allows space for the bur to be formed at the welding when the clamps are pushed up. At the same time the current and heating is evenly distributed. When the metal is prepared so that the pieces meet in a straight line, as shown in Fig. 1, the resultant line of welding will follow substantially the axis of the regular space between the toothed edges, when they are brought near to one another, as shown in Fig. 4. If desired, the forward face or edge of the clamps may be slightly undercut, as shown in Fig. 2, where it engages the work, but this is not necessary to the practice of my invention. Said undercut, if used, would preferably follow the whole irregular face of the clamp from side to side, so that there should be an undercut at all portions thereof which engage the work.

What I claim as my invention is:

1. In an electric metal working apparatus, intermeshing clamp jaws engaging the work at opposite sides of its heated section as and for the purpose described.

2. In an electric metal working apparatus, a clamp jaw having a toothed edge next the heated section of work.

3. In an electric metal working apparatus, a clamp jaw having a serrated edge next the heated section of work.

4. In an electric metal working apparatus, intermeshing clamp jaws having an undercut at their portion adjoining the heated section of work as and for the purpose described.

Signed at Lynn, in the county of Essex and State of Massachusetts, this 24th day of April, A. D. 1911.

ELIHU THOMSON.

Witnesses:
  JOHN A. MCMANUS, Jr.,
  CHARLES A. BARNARD.